Sept. 4, 1956  B. JACKS  2,762,003
SHAFT POSITIONING CONTROL
Filed April 29, 1955  3 Sheets-Sheet 1

INVENTOR.
BASIL JACKS
BY
Raymond A. Paquin
ATTORNEY.

Sept. 4, 1956             B. JACKS             2,762,003
SHAFT POSITIONING CONTROL
Filed April 29, 1955                      3 Sheets-Sheet 3
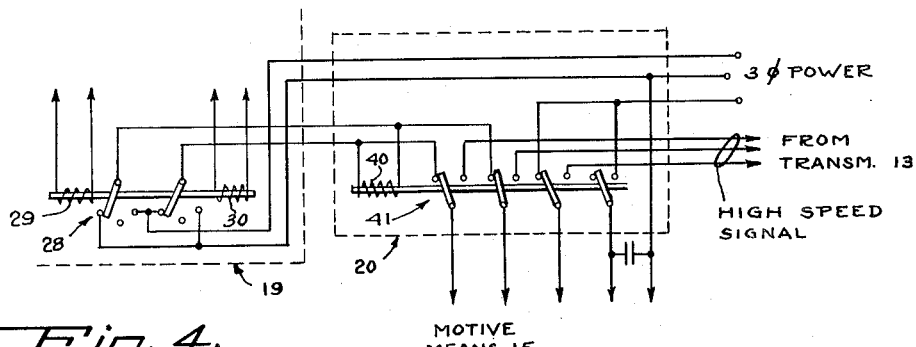
_Fig. 4._
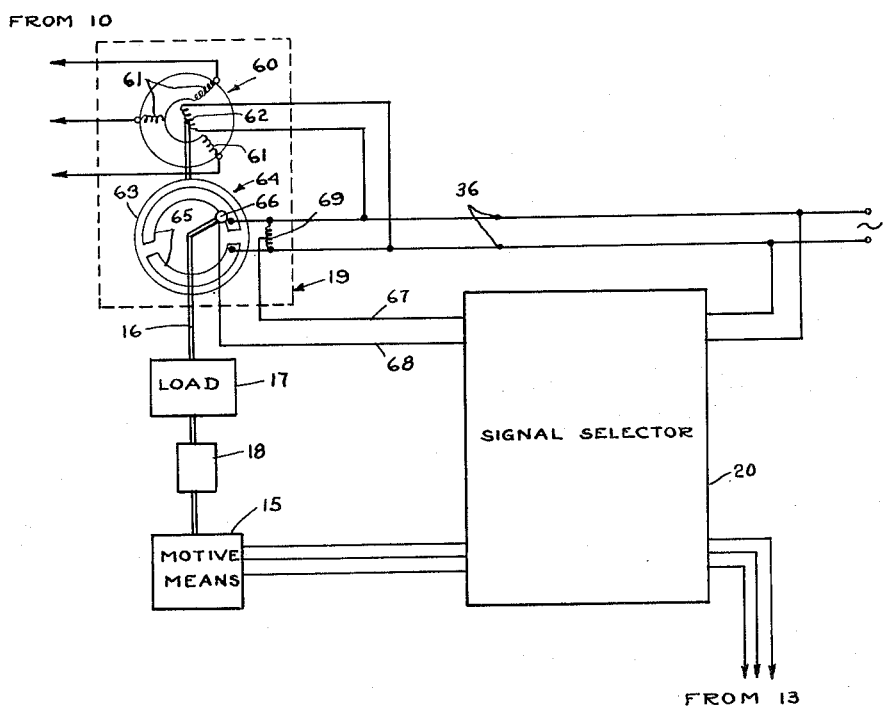
_Fig. 5._
INVENTOR.
BASIL JACKS
BY
Raymond A. Paquin
ATTORNEY.

United States Patent Office 2,762,003
Patented Sept. 4, 1956

2,762,003

SHAFT POSITIONING CONTROL

Basil Jacks, East Meadow, N. Y., assignor to American Bosch Arma Corporation, a corporation of New York Application April 29, 1955, Serial No. 504,771

9 Claims. (Cl. 318—30)

The present invention relates to remote control devices and has particular reference to double-speed control of shaft displacement.

A double speed instrument servo system conventionally consists of high and low speed control transformers, a servomotor, an amplifier and a transfer device. The reliability of the usual system under service conditions is sometimes questionable due to the inherently delicate nature of power amplifiers. These systems have also been found to be relatively high in cost. The present invention performs the same function as these prior servo-systems, but with additional reliability and lower cost.

In accordance with the present invention, the low speed error between the order and the driven shafts actuates a signal selecting device to apply either a slewing signal or a high speed positional signal to the positioning motor depending on whether the shafts are far from, or close to, synchronism.

In a preferred embodiment of this invention, the error detector is a self-synchronous control transformer which operates a phase sensitive relay according to the phase of its output and thereby controls the signal selector relay which applies either a slewing signal or a positional signal to the motive means. A single motive means is employed for both coarse and fine positioning. This motive means is a self-synchronous receiver of the usual type having polyphase windings normally energized by a high speed signal and a single phase winding, rotatable relatively thereto, energized by a constant voltage. For rapid positioning the self-synchronous receiver is connected as an induction motor where the polyphase windings are energized by a polyphase signal and the single phase winding is not energized.

Many alternative devices may be substituted for the preferred embodiment which will work equally well and may offer certain advantages under particular conditions. In one instance, for example, where it is desired to eliminate the amplifier in an existing system, separate motors for coarse and fine control may be employed. For operation of the phase sensitive relay direct current is necessary and in order to eliminate the rectifiers which are required in an A. C. powered circuit, the low speed transmitter and receivers can be potentiometers energized by direct current. These and other modifications will be described.

For a more complete understanding of the invention, reference may be had to the accompanying diagrams, in which, Fig. 1 is a single line diagram showing the basic invention;

Fig. 4 shows how three phase power can be connected in Fig. 2; and

Fig. 5 is another modification of Fig. 2.

Figure 1:
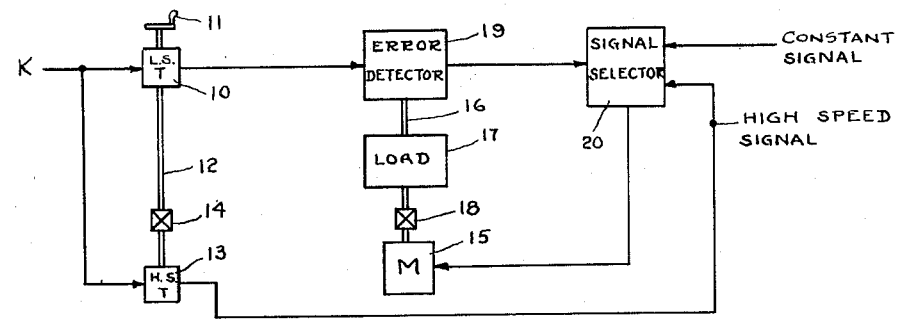

A generalized circuit for the double speed receiving system of this invention is shown in Fig. 1. Low speed transmitter 10 is energized by the constant voltage K, and its movable member is displaced by some device which is represented by the hand crank 11. Shaft 12, also driven by the hand crank 11, drives the movable member of high-speed transmitter 13, which is also energized by K, through the gearing 14.

At a remote location, the motive means 15 is used to position the shaft 16 of load 17, through speed reduction gearing 18, in synchronism with the shaft 12. Shaft 16 also drives one member of the low speed error detector 19 which receives the low speed positional signal from transmitter 10 and produces an output error signal dependent upon the relative displacements of shafts 12 and 16. The error signal is used to control the signal selector 20 by means of which the signal to motive means 15 is selected. The motor energizing signal may be either the constant voltage slewing signal or the high speed positional signal from transmitter 13.

Whenever the shafts 12 and 16 are far from synchronism, the control means 20 is operated to apply the constant slewing voltage to the motive means 15 whereby motive means 15 drives the shaft 16 in the direction tending to reduce the error signal and bring shaft 16 into synchronism with shaft 12. When the error signal has been reduced sufficiently, the control means 20 is operated to apply the signal from high speed transmitter 13 to the motive means 15 whereby the shaft 16 is driven by motive means 15 until its position corresponds with that of shaft 12.

Figure 2:
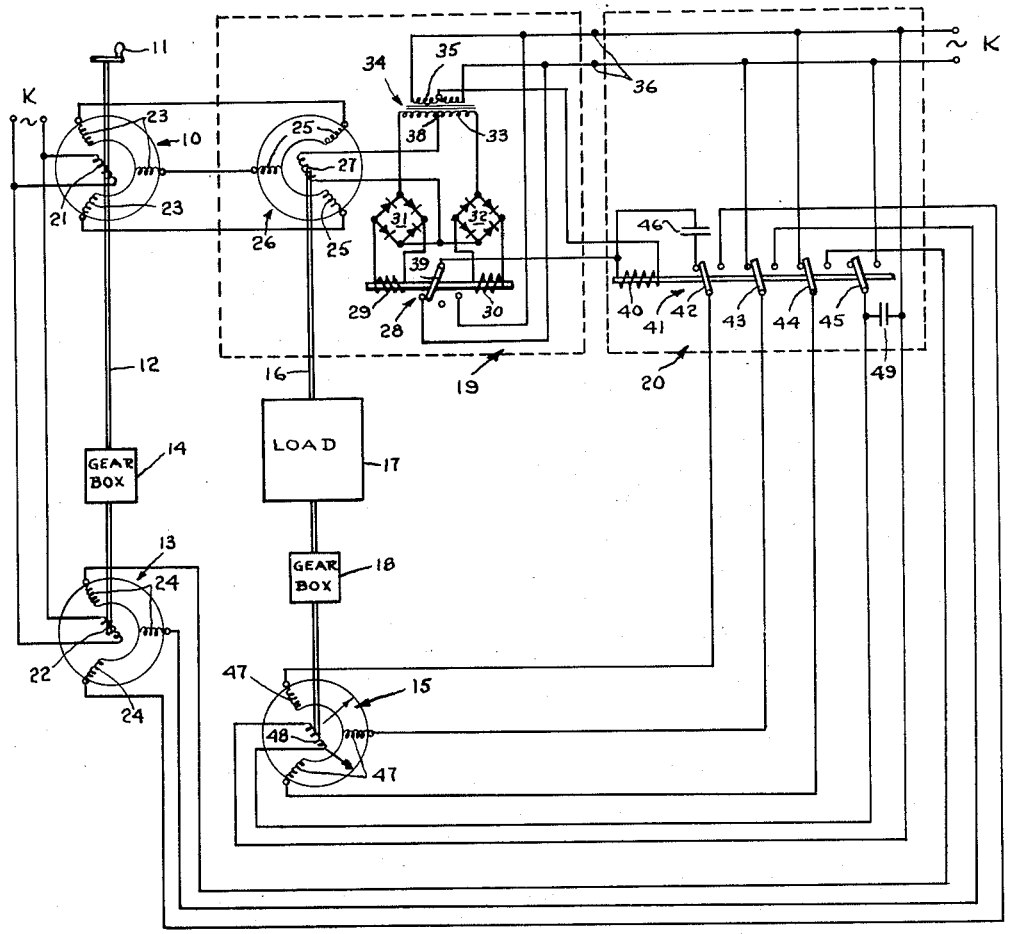
Fig. 2 is a preferred embodiment of the present invention.

Figure 2 shows a preferred embodiment of the generalized circuit of Fig. 1. In this embodiment the transmitters 10 and 13 are of the self-synchronous type having energized rotor windings 21 and 22, respectively, and polyphase stator windings 23 and 24. The rotor winding 21 is driven directly by shaft 12 and the rotor winding 22 is driven by shaft 12 through the gearing 14 such that rotor winding 22 rotates at a speed thirty-six times that of rotor winding 21.

The stator windings 23 of the low speed self-synchronous transmitter 10 are electrically connected to, and energize the stator windings 25 of self-synchronous control transformer 26, while the rotor winding 27 of the control transformer 26 is mechanically driven by shaft 16.

The error detector 19 includes a polarity sensitive relay switch 28 having a pair of relay windings 29, 30 which are connected to the outputs of the respective full-wave rectifier bridges 31, 32. The input sides of the rectifier bridges 31, 32 are connected in series across the secondary winding 33 of transformer 34, the primary winding 35 of which is energized by the constant alternating voltage K which is also at mains 36. The rotor winding 27 is connected to the mid tap 38 on winding 33 and to the junction between rectifiers 31, 32. Thus the energization of windings 29, 30 will be unbalanced according to the phase of the signal output of winding 27, and for phase of one sign the movable contact 39 of switch 28 is drawn to the left while for opposite phase the movable contact 39 is drawn to the right. When the output signal of winding 26 is small so that the windings 28, 29 are substantially equally energized, the movable contact 39 will be disconnected from both of the left hand and right hand contacts, and switch 28 will be open.

The left hand and right hand contacts of switch 28 are connected to the A. C. mains 36, and the movable contact 30 is connected to one side of the relay winding 40 of switch 41, the other side of which is connected to the midtap on winding 35. Thus, whenever the output of winding 27 is of considerable magnitude, i. e. when shaft 16 is far off synchronism with shaft 12, relay winding 40 will be energized by the output of switch 28 and the movable contacts 42, 43, 44 and 45 of the relay switch 41 will be drawn to the left in Fig. 2.

Theoretically, the slave relay switch 41 could be operated by the armature of the phase sensitive relay switch 28 instead of the relay winding 40 but, in the present state of the art, phase sensitive relays are rather delicate and cannot be expected to operate such a heavy load.

The voltage for energizing the motive means 15 when the shaft 16 is far off synchronism with shaft 12 is a polyphase signal provided from the single phase mains 36, and the phase-splitting capacitor 46 which is connected to the movable contact 39 of switch 28. To this end the left hand stationary contacts of switch 41, with which the movable contacts 42, 43 and 44 cooperate, are connected to the capacitor 46, to one of the mains 36 and to the other of the mains 36 respectively. The movable contacts 42, 43 and 44 are connected to the stator windings 47 of the motive means 15, which for this embodiment is a self-synchronous receiver of the usual type.

When the split-phase excitation is applied to the stator windings 47, a pair of rotating poles at right angles to one another have their axes in the substantially normal relation shown by the arrows in Fig. 2, the receiver 15 will operate as a capacitor run induction motor to drive shaft 16, until the rotor winding 27 of control transformer 26 is driven near the null position and switch 28 is opened.

When switch 28 opens, relay winding 40 is de-energized and switch 41 is operated to position the movable contacts 42, 43, 44 and 45 on the right hand stationary contacts so that the stator windings 47 are connected directly to the stator windings 24 of transmitter 13, and the rotor winding 48 is connected to the mains 36 through contact 45. A capacitor 49 is connected across the rotor winding 48 to protect the contacts of switch 41, and to improve the operation of motive means 15 when slewing.

In this condition, the receiver 15 is connected like the normal single-speed self synchronous receiver, whence the rotor winding 48 is driven toward the null position where the position of rotor 48 corresponds to the position of rotor 27, and the shafts 12 and 16 are synchronized.

It will be seen that the amplifier, high speed control transformer, servomotor, and resonant damp usually present are eliminated in the circuit of Fig. 2 while the relay transfer means and its control relay replace the usual electronic transfer circuit. Damping is provided by the internal damper of the receiver 15. For more reliable operation a bias voltage must be inserted in the low speed output of rotor winding 27 as in the conventional double speed synchro systems to prevent hang-up at 180° away from the required position although the bias voltage source is not shown in Fig. 2 since its necessity and use is well known in the art.

It is contemplated that the physical embodiment of the invention may take many forms without departing from the spirit of the invention. For example, separate slewing and fine control motors may be included in the motive means 15. The error sensing devices can be potentiometers, for example, and the relay type signal selector and slewing order control means can be replaced by electronic or magnetic control units if desired.

Figure 3:
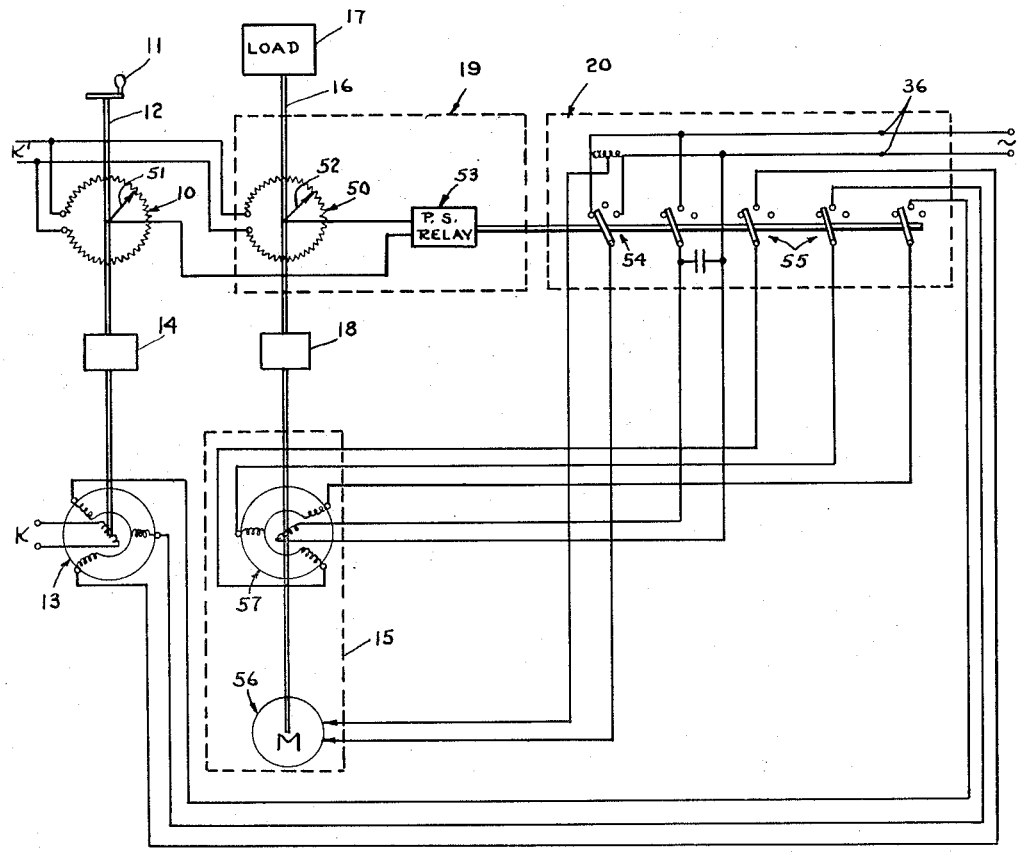
Fig. 3 is one modification of Fig. 2.

The circuit of Fig. 3, for example, is a modification of Fig. 2, showing use of potentiometers for the low speed units and a motive means 15 containing separate means for low and high speed control. Thus, low speed transmitter 10 and receiver 50 comprise energized potentiometers having movable contacts 51 and 52 respectively which are driven by the shafts 12 and 16. The movable contacts 51 and 52 are connected to energize a phase sensitive relay 53 which actuates the movable contacts of thru position switches 54 and 55. The movable contacts of switch 54 are connected to energize the slewing motor 56 according to the polarity of the error signal from low speed unit 19 by connecting the outer stationary contacts to opposite mains 36 and the movable contact to motor 56. The other side of motor 56 is connected to a neutral point provided on a winding connected across the mains 36.

Motor 56 will therefore drive shaft 16 until the movable contact 52 is substantially in correspondence with movable contact 51. In this condition, relay winding 53 will be de-energized to position the movable contacts of switches 54, 55 to the center stationary contacts whereby the self-synchronous receiver 57 is energized by the output of self-synchronous transmitter 13 and the motor 56 is deenergized. Thus, receiver 57 will continue to drive shaft 16 until the shaft is exactly in synchronism with shaft 12.

Fig. 4 is a modification of a part of Fig. 2 which shows a three-phase power supply for energization of the motive means 15 during rapid positioning operations so that the phase-splitting capacitor 46 of Fig. 2 can be eliminated. In this case, the phase sensitive relay switch 28, operated by the output of control transformer 26, is a reversing switch between one phase of the 3 phase supply and two of the contacts of switch 41 which are connected to two of the stator winding 47 of the motive means 15 (see Fig. 2). The remaining winding 47 is connected through switch 41 to the third phase of the 3 phase supply.

Fig. 5 shows another embodiment where the error detector 19 employs a follow up head of the split disc type for coarse control. In this modification a low speed synchro receiver 60, having polyphase windings 61 which are energized by the low speed transmitter (not shown) and a single phase winding 62 connected to the power mains 36, drives the disc 63 of a follow-up head 64. The disc 63 carries two arcuate contacts 65, each connected to a different one of the mains 36. Shaft 16, driven by the motive means 15 positions a movable contact 66 on the disc 63. Whenever the shaft 16 is far from the desired position (synchronism with shaft 15 of Fig. 2) the movable contact 66 cooperates with one of the arcuate contacts 65. Thus a voltage appears between leads 67, 68, where lead 67 is connected to the midpoint of an impedance 69 which is connected across the mains 36, while lead 68 is connected to the movable contact 66. The signal at leads 67, 68 controls the signal selector 20, which may be the type shown in Fig. 2 for example, so that when a signal appears at leads 67, 68 the motive means 15 slews the shaft 16 and whenever no voltage appears, i. e. the movable contact 66 lies between contacts 65, the motive means is responsive to the high speed signal from transmitter 13. The insulated portions between contacts 66 may be displaced by 185° in order to prevent "hang-up" at 180° away from the desired positions in the well known manner.

I claim:

1. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means.

2. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said motive means including a self-synchronous motor.

3. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said high speed transmitter consisting of a self synchronous generator.

4. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said high speed transmitter consisting of a self synchronous generator, said motive means including a self synchronous motor.

5. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said low speed transmitter comprising a self synchronous generator.

6. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said receiving means containing a self synchronous control transformer.

7. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said low speed transmitter comprising a self synchronous generator, said receiving means containing a self synchronous control transformer.

8. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said low speed transmitter comprising a self synchronous generator, said receiving means containing a self synchronous motor.

9. In a device of the character described, high and low speed positional transmitters displaced according to a given value, a load shaft, motive means for driving said shaft, receiving means for said low speed transmitter, electrical connections between said receiver and said low speed transmitter, operative connections between said load shaft and said receiver, selecting means having a pair of inputs and an output and controlled by said receiver according to the difference between the position of said load shaft and said given value, a source of constant voltage, electrical connections between one of said inputs and said voltage source, electrical connections between said high speed transmitter and the other of said inputs and electrical connections between the output of said selecting means and said motive means, said low speed transmitter comprising a potentiometer and said receiving means containing a potentiometer.

No references cited.